United States Patent [19]

Barrett

[11] 4,348,190
[45] Sep. 7, 1982

[54] INTERLOCKING MOLECULAR MODEL SYSTEM

[76] Inventor: Edward J. Barrett, McGuire La., Croton-on-Hudson, N.Y. 10520

[21] Appl. No.: 276,180

[22] Filed: Jun. 22, 1981

[51] Int. Cl.$^3$ .............................................. G09B 23/26
[52] U.S. Cl. .................................................... 434/278
[58] Field of Search ................ 434/277, 278, 279, 280

[56] References Cited

U.S. PATENT DOCUMENTS

| | | | |
|---|---|---|---|
| 3,230,643 | 1/1966 | Mathus | 434/278 |
| 3,284,926 | 11/1966 | Godfrey | 434/280 |
| 4,030,209 | 6/1977 | Dreiding | 434/278 |
| 4,245,920 | 1/1981 | Barrett | 403/305 |

OTHER PUBLICATIONS

"Bipolymer Models of Nucleic Acids", Barrett, J. of Chem. Education, vol. 56, pp. 168, 169 (1979).

Primary Examiner—Harland S. Skogquist
Attorney, Agent, or Firm—Kenyon & Kenyon

[57] ABSTRACT

A molecular model system in which a first component representative of an atom includes at least one elongated shank that has a cylindrical section of one cross sectional area with an inwardly extending shoulder and an outwardly extending abutment located between the shoulder and the part of the component that represents the nucleus. The molecular model system further includes a fastener component that has a hollow tubular portion longitudinally slotted at one end and having an axial length that represents predetermined portion of a covalent radius of the atom. The inner surface at one end of the slotted end portion extends inwardly to be hooked behind the shoulder to interlock with the shank.

17 Claims, 8 Drawing Figures

U.S. Patent  Sep. 7, 1982  4,348,190
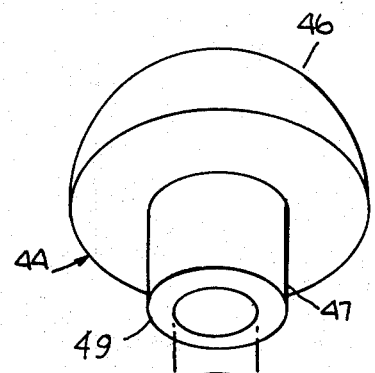
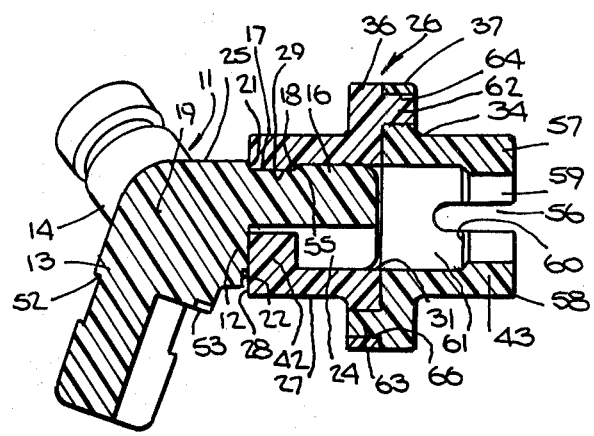
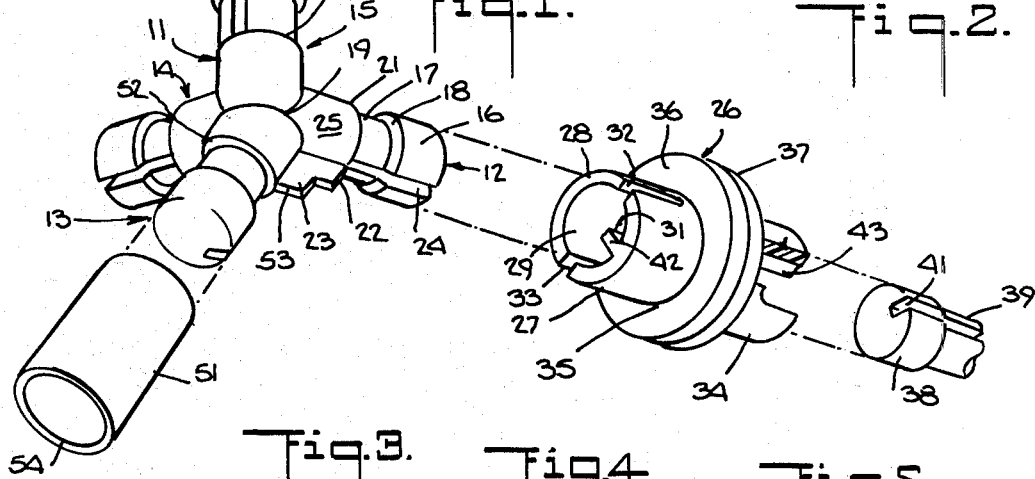
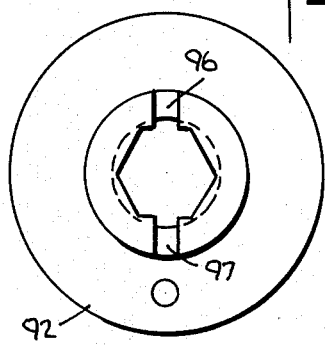
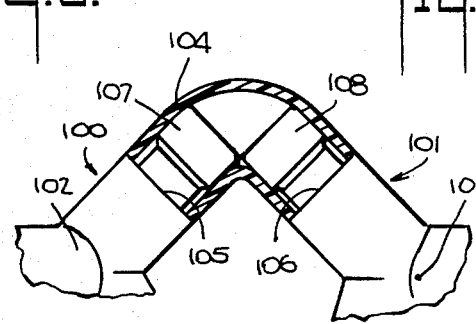
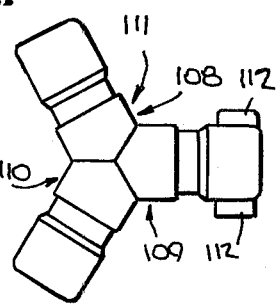

INTERLOCKING MOLECULAR MODEL SYSTEM

BACKGROUND OF THE INVENTION

1. Field of the Invention

This invention relates to the field of molecular model systems and particularly to systems that include components molded of plastic material sufficiently resilient to permit them to be interlocked firmly but in such a way that torsion angles of at least some of the functional groups can be rotated without pulling the components apart.

2. Description of the Prior Art

Theory and experimental analysis have combined to establish that the atoms making up a molecule have certain geometrical relationship with respect to each other. For over one hundred years chemists have recognized that it would be valuable to be able to make accurate models of molecules in order to help visualize the structure and chemical nature of the molecules to see how they may be produced or modified. A model that can be visually examined and geometrically measured can offer an insight into the molecule that is an invaluable assistance to knowledge obtained by chemical analysis and study of X-ray defraction patterns. This is especially true in the case of macromolecules, such as the polynucleotides and polypeptides that are involved in living matter.

Descriptions of various types of molecular models are given in:

"The Use of Models in Stereochemistry", Ann Walton, *Progress in Stereochemistry*, 4, 335–375 (1968);

"A Survey of Atomic and Molecular Models", Arnold J. Gordon, *J. Chem. Educ.*, 47, 30–32 (1970);

"Some Reflections on the Use and Abuse of Molecular Models", Quentin R. Petersen, *J. Chem. Educ.*, 47, 24–30 (1970);

"New Skeletal-Space-Filling Models", Frank H. Clarke, *J. Chem. Educ.*, 54, 230–235 (1977); and "Bipolymer Models of Nucleic Acids", Edward J. Barrett, *J. Chem. Educ.*, 56, 168–169 (1979)

Those articles and the articles listed in their footnotes describe a wide variety of models from the early ball-and-stick models through the improved skeletal models, space-filling models, and framework molecular models (FMM). One of the purposes of the models is to represent the actual molecules as accurately as current knowledge permits, but this is not always consistent with other objects, such as clarification of geometrical relationships, including the internuclear distances and the torsion angles that exist between the nuclei of the atoms in the molecule. For example, the space-filling models show how the space between nuclei of a molecule is filled, bit it is quite difficult to visualize the internuclear distances and torsion angles in such models. It is almost impossible to construct some extremely complex molecules, such as t-RNA, of space-filling components. On the other hand, a Dreiding stick model shows distances and angles but does not give a realistic representation of steric volume.

Another factor that is particularly important in the case of macromolecules is the ability of the components of the molecule to remain properly interconnected after they have been assembled. The model structures shown in my U.S. Pat. No. 4,245,920 permit a good compromise between the technical accuracy of space-filling models, and the expository clarity of the skeletal models. Furthermore, the fasteners described in that patent link the atoms together so that a large and complex structure can be assembled with known angular relationships between the parts.

However, the torsion angles of at least the simpler organic molecules are not constant but continuously vary because of the fact that the molecules constantly receive heat energy. In order to see how a macro molecule may be varied, it is sometimes desirable to be able to combine a model of a smaller molecule with the model of the macromolecule to determine whether they can reasonably fit together and thus indicate that the actual molecules can be chemically combined. This may require the functional groups of the smaller molecules be capable of rotating relative to each other to achieve the desired fit with the macromolecule, and yet, it is so essential that the components of the small molecule be joined together longitudinally as accurately and firmly as the components of the macromolecule.

As in all molecular model systems, it is desirable that the components be capable of being produced inexpensively and assembled easily. It is essential that the components give accurate representations of the internuclear distances and torsion angles, and that components representing van der Waal's radii for outer atoms give a good representation of the geometry that exists in the actual molecule.

OBJECTS AND SUMMARY OF THE INVENTION

It is one of the objects of the present invention to provide a molecular model system comprising components that can be easily assembled into a model of substantial complexity and yet are sufficiently interlocked to hold together firmly while permitting some parts of the model to rotate with respect to other parts.

Another object of this invention is to provide molecular model components of an interlocking type the can be molded of inexpensive plastic material so as to provide model sets that can be made available to students and others operating on restricted research budgets.

Another object of the invention is to provide model components that can be easily fitted together in a minimum length of time and yet will result in molecular models of good accuracy.

Further objects will become apparent from the following specification together with the drawings.

The system includes components that represent atoms and other components that serve as fasteners between the atoms for mechanical assembly purposes but also represent bonds, or portions of bonds, between atoms. Each component representing an atom includes at least one elongated shank extending outwardly from the location of the part of that component that corresponds to the nucleus of the atom. The shank thus represents at least the start of a bond between the atom and another, and it includes an outer cylindrical section with the outer end remote from the location of the nucleus, and a second cylindrical section adjacent to the first cylindrical section but closer to the part representing the location of the nucleus. The cross sectional area of the first cylindrical section is larger than that of the second cylindrical section and the surface portion of the shank between the first and second cylindrical sections defines a shoulder that extends inwardly from the first cylindrical section. Between the second cylindrical section and the part that represents the nucleus is an abutment that establishes a stop against which a fastener component can be pressed to establish one point along the length of the structure that represents the internuclear distance between two atoms of the molecular model.

The fastener includes a tubular portion slotted at one end so that the two portions of that end can be spread apart to allow them to fit over the first cylindrical section of the shank. The inner surface of the tubular portion at the slotted end extends inwardly so that it fits around the second cylindrical section of the shank and has an axial length substantially equal to that of the second cylindrical section. This inwardly extending part at the slotted end of the tubular portion serves as an axial lock that engages the shoulder between the first and second cylindrical sections of the shank to hold the fastener in place on that shank. The remainder of the inner surface of the tubular portion has a large enough cross section to fit around the first cylindrical section of the shank when the fastener component is forced onto the shank with the axial lock engaging the second cylindrical section.

The axial length of the tubular portion plus the axial length of that part of the shank between the abutment and the point representing the nucleus of the atom corresponds to the covalent radius of that atom. The covalent radius differs from element to element and so a complete molecular model system requires a number of atom-representing components and fasteners of different lengths. It is preferable to color code these components in accordance with color standards that have been established heretofore. For example, it is typical for components representing carbon to be colored black and those that represent oxygen to be colored red and those that represent nitrogen to be colored blue, and so on. One of the reasons that color coding is particularly desirable in the present instance is that the lengths of the fasteners for different atoms are not very different from each other, and the wrong components could be selected by a model builder if they were not color-coded.

In the case of the components that represent atoms, there is no difference between the lengths of shanks on atom components that represent specific chemical elements, but these components should also be color-coded to clarify the atomic constituents of a molecule. However, there is a difference in the number of shanks on different atom components. Tetravalent carbon has four shanks, each of which is spaced 109.5° from each of the others. Components representing atoms of other elements may have from one shank to six, depending on the number of bonds that may be made with that atom in a particular model.

The shanks may have a round cross section so that the fasteners can easily rotate on them. However, it may be desirable in some circumstances to provide components that permit only certain angular relationships between adjacent atoms or functional groups. In that case, the shanks may be given a polygonal cross section and the fasteners can be provided with an internal polygonal cross section to allow only the same number of angular relationships as the number of sides of the polygon. Another way of limiting the angular orientation is to provide a longitudinal slot along the shank and to provide a key extending inwardly from the inner surface of the fastener. The longitudinal slot may be provided in each shank, even though the shanks are round, so that each atom model may be used in a structure requiring rigid angular orientation. Such rigidity can then be obtained, when desired, by using fasteners that have the necessary keys.

The fastener components include not only the tubular portion to extend over the shank of one atom model but a mirror image of that tubular portion that extends over a like shank of another atom model. Since the outer ends of both of the tubular portions extend radially inwardly, a fastener component comprising two such ends can be made by molding each half separately and welding or gluing them together. Such joining of the parts together is facilitated by providing an outwardly extending flange at the ends to be joined. In the case of fasteners that are to provide rigid angular orientation, each of the fastener parts must be provided with its own key. The flanges can be provided with matching pins and holes angularly oriented in any desired manner with respect to the keys so that the key at one end of a complete fastener can be exactly aligned with a key at the other end or can be offset by any desired angle.

Furthermore, a composite fastener may be made of identical components, if the atoms on each side are the same. If atoms of different chemical elements are to be joined, they must be made with tubular portions of different lengths.

As a further alternative, a fastener part of the type described can be joined to a fastener part of the type described in my U.S. Pat. No. 4,245,920 to allow atomic components or functional groups constructed according to the present invention to be joined to atomic components or functional groups described in that patent. That makes it possible to take advantage of the angular rigidity available in the structure of that patent in combination with the angular freedom provided by the non-keyed components of the present invention.

BRIEF DESCRIPTION OF THE DRAWINGS

FIG. 1 is an exploded perspective view of components for a molecular model system according to the present invention.

FIG. 2 is a cross sectional view of a component representing an atom and a fastener component according to this invention.

FIG. 3 is an exploded perspective view of two parts of a complete fastener component of the type shown in FIGS. 1 and 2.

FIG. 4 is a modified representative of an atom in accordance with this invention.

FIG. 5 is a cross sectional view of a modified fastener produced with the atom component in FIG. 4.

FIG. 6 is an end view of the fastener in FIG. 5.

FIG. 7 is a cross sectional view of atom components joined together by flexible tubing.

FIG. 8 shows a modified embodiment of an atom component.

DETAILED DESCRIPTION OF THE INVENTION

In FIG. 1 a component 11 represents a tetravalent carbon atom and includes four shanks 12–15. These shanks are formed so as to be identical with each other and they are arranged in the configuration known as tetrahedral. In that structure, the angle between the axes of any two of the shanks, for example, the shanks 12 and 13, in a plane that includes both their axes is 109.5°.

The shanks 12–15 are identical with each other, and each includes a first cylindrical section like the section 16 on the shank 12 and a second cylindrical section like the section 17. Between the cylindrical sections 16 and 17 is an inwardly extending shoulder 18 that is preferably formed so that it tapers inwardly rather than being a flat, annular surface. At the other end of the cylindrical section 17 closer to the center 19, which represents the location of the nucleus of the atom, is an abutment 21. In this embodiment, the abutment is extended outwardly by the end surface 22 of a flange 23 that lies in the plane but also includes the axis of the shanks 12 and 13. Alternatively, the portion 25 of the shank 12 may have a larger diameter than that of the first cylindrical section 16. An angular alignment slot 24 extends from the outer end of the first cylindrical section 16 to the opposite end of the cylindrical section 17.

A fastener component 26 is shown spaced from and aligned with the shank 12. The fastener 26 is made of two parts that are essentially mirror images of each other. The first part of the fastener component 26 includes a tubular portion 27, the inner surface of which has two radii. At the end 28, the inner surface 29 has a radius that allows it to fit relatively closely around the second cylindrical section 17 of the shank 12. The axial length of this part of the inner surface of the tubular portion is substantially equal to the axial length of the cylindrical section 17, so that when the fastener component 26 is replaced on the shank 26 in operative position, the surface portion 29 embraces the cylindrical section 17 and engages the shoulder 18 at one end and the abutment 21 at the other end.

At the other end of the tubular portion 27, the inner surface 31 has a larger radius corresponding to the radius of the first cylindrical section 16 of the shank 12 to receive that cylindrical section when the fastener 26 is forced onto the shank 12. In order to join the fastener 26 to the shank 12, the fastener is made of somewhat resilient, but tough, plastic material, such as Delrin or acrylonitrile-butadiene-styrene (ABS) and is axially slotted, as indicated by the slots 32 and 33.

The tubular portion 27 is joined to a similar tubular portion 34 at the other end by providing each of these tubular portions with a flange 36 and 37, respectively. These flanges extend radially outwardly and provide means for holding the two parts of the fastener component together. The inner surface of the tubular portion 34 is not shown but is identical with that of the tubular portion 27 and is shown aligned with the cylindrical end 38 on a shank 39 that is part of another atom model. The shank 39 has a slot 41 extending longitudinally along it similar to the slot 24 in the shank 12.

The slots 24 and 41 are provided in case it is desired to fix the angular relationship of one atom model with respect to another. To do so requires that the tubular portions 27 and 34 include internal keys 32 and 43 to engage the slots 24 and 41. As is illustrated, the keys 42 and 43 are not aligned in the same plane. The slot 24 must be aligned with the key 42 in order to receive the fastener 26, and the slot 41 must also be aligned with the key 43 in order to fit into the other end of the fastener. Since all of the atom models like the model 11 are molded with their slots in specific locations, the relative angular orientations of the keys 42 and 43 in a fastener determine the torsion angles of the components connected together by the fastener 26.

Another component 44 representing an atom is shown spaced from and aligned with the shank 15. The atom represented by the component 44, which should be color coded, is typically located at the surface of a molecule, where it is especially important to illustrate the van der Waal's radius. The hemispherical portion 46 of the surface of the component is formed to the proper scale according to the van der Waal's radius for the atom represented. The scale is the same as that used for the bond lengths represented by fasteners, such as the fastener 26 in the model, and may typically be 1.25 cm/A, although the invention is not limited to that value.

The component 44 had a hollow stem 47 that fits snugly on the outer cylindrical section 48 of the shank 15, and since the component does not have to support any other components, simple frictional engagement with the cylindrical section 48 is sufficient. The end 49 of the stem is pressed against the abutment 51 when the component 44 is in place on the shank 15, and this causes the center of the hemispherical surface 46 to be in the proper position relative to the nucleus location 19.

A space-filling component like the component 44 can be placed at every appropriate location in a molecular model made up of the components described herein, and the resulting structure will be almost as realistic (based on present-day understanding of molecular structures) as the space-filling models of Stuart or Corey-Pauling-Koltun (CPK). At the same time, the inner structure is more visible than that of a Stuart or CPK model, which gives a student or scientist better insight into the complete intramolecular relationships.

There are circumstances when the use of spacing filling components is not desirable and when the inner framework is of primary interest. In that case, instead of the space-filling component 44, a hollow plastic tube 51 of a selected length may be used instead. The tube 51 should also be color coded, and its length can be such that, when placed on the shank 13 and pressed against the abutment 52, including the surface 53 of the flange 23, the outer end 54 will be located in the same position as would the outermost part of the surface 46 if the component 44 were placed on the shank 13. This would give a certain degree of realism to the structure, but realism may not always be the most ideal characteristic. For tutorial purposes, it may be desirable to make the tube 51 twice as long as the component 44. That would emphasize the angular relationship of the bonds and would call attention to the location and orientation of the atom represented by the tube.

FIG. 2 shows a cross-sectional view of the shank 12 and the fastener 26 to illustrate the way that they fit together. The axial length of the inner surface 29 at the outer end of the tubular portion 27 is substantially equal to the axial length of the cylindrical section 17 of the shank 12. As a result, the end 28 of the tubular portion 27 presses against the abutment 21, and an inner shoulder 55 between the inner surfaces 29 and 31 of the tubular portion 27 presses against the shoulder 18. This prevents any axial movement of the fastener 26 on the shank 12 but does not, in itself, prevent rotational movement of the fastener on the shank. The key 42, which is shown in cross-section, does prevent rotation of the fastener on the shank, but is is preferably permissible to form the tubular portion 27 without a key.

The cross-sectioning of the tubular portion 27 in FIG. 2 does not permit the slots 32 and 33 to be shown, but a similar slot 56 in the tubular portion 34 is formed in the same way. The resiliency of the material of which the fastener 26 is made permits the two parts 57 and 58 of the tubular portion 34 to be spread apart so that the first cylindrical section of a shank of another atom can be forced longitudinally between these parts. The tubular portion 34 has an inwardly extending portion 59 at its outer end similar to the portion defined by the surface 29 in the tubular portion 27, and there is a sloping shoulder 60 between the portion 59 and another portion 61 of larger diameter. This sloping shoulder 60 helps to wedge the portion 59 in place in the same manner that the corresponding part at the other end of the tubular portion 27 is wedged between the abutment 21 and the shoulder 18. Furthermore, the sloping shoulder 60 makes it easier to disassemble the fastener 26 from an atom shank when it is desired to change the configuration of the molecular model.

FIG. 2 also shows two pins 62 and 63 inserted in holes 64 and 66, respectively, to hold the two parts of the fastener 26 in proper angular alignment. By making the pins 62 and 63 slightly oversized with respect to the holes 64 and 66, the two parts of the fastener 26 can be held firmly together while they are being glued or welded.

FIG. 3 shows a different arrangement of pins for angularly orienting two parts of a fastener. In FIG. 3 a fastener 67 is shown with its two parts axially separated. The fastener 67 includes tubular portions 27 and 34 identical with those in FIG. 2, but the flanges 68 and 69 are different. The flange 68 has two pins 70 and 71, which are aligned with two holes 72 and 73 in the flange 69. In addition to these holes, the flange 69 also has other holes, such as the holes 74 and 76 to permit different alignment of the flanges 68 and 69. The flange 69 can have the holes arranged at any angular position to provide for any desired angular orientation between the two parts of the fastener 67.

FIG. 4 shows a modified embodiment 77 of the tetrahedral component 11 in FIG. 1. This embodiment has shanks 78-81 with outer cylindrical sections 83-86, respectively, of circular cross-section, but the second cyindrical sections, of which only sections 88-90 are shown, are six-sided cylinders. A fastener 92 shown in FIG. 5 is provided with inwardly extending axial locks 93 and 94 of regular hexagonal configuration to engage hexagonal cylindrical surfaces of the type illustrated by reference numerals 88-90, thereby locking the fastener 92 in any of six specific angular positions. Because of the slots 96 and 97, shown in the end view of the fastener 92 in FIG. 6, the bifurcated outer ends of the tubular portions 98 and 99 can be spread apart enough to allow the fastener to be rotated to any of its six positions, if sufficient force is used. However, the required force is great enough so that the fastener 92 cannot rotate too easily.

FIG. 7 shows part of a model of a cyclopropane molecule. The bond angles of the carbon atoms in cyclopropane are not at the regular angles, which would be 109.5° but are irregular angles of 60° each. Therefore, the shanks 100 and 101 of two atoms 102 and 103 constructed as tetrahedral structures similar to the shank 12 in FIG. 1 are connected together by a piece of flexible Tygon polyvinyl chloride tubing 104 of the proper length. The ends of the tubing engage abutments 105 and 106, which are larger in diameter than the outer cylindrical sections 107 and 108. The length of the tubing is chosen so that, together with the short parts of the shanks 100 and 101 between the abutments and the points 108 and 109 that represent the atomic nuclei, the latter are spaced apart by the proper internuclear distance. The axial length of each of cylindrical sections 108 and 107 is chosen so that these sections are just touching when the atoms are incorporated in a model of cyclopropane.

The use of flexible tubing 104 to connect the shanks 100 and 101 together has two main advantages. It permits three tetrahedral structures in which the shanks have a bond angle of 109.5° to be used in constructing a model that has irregular bond angles such as 60°. The first advantage is that it is unnecessary to include special irregular-angle atom-representing components in a kit of components and this keeps the cost of the system down. In addition this arrangement places a stress on the flexible tubing which gives a visible representation of the strained condition inherent in cyclopropane and, to a lesser extent, in cyclobutane, which uses four tetrahedral structures to produce a square model. There is a distinct tutorial advantage in making the strained molecular structure visible.

The atom model component 108 shown in FIG. 8 has only three round shanks 109-111 rather than the four shanks of the tetrahedral component 11 in FIG. 1. The shanks 109-111 are all in the same plane and are spaced 120° apart, and this component is especially useful in constructing models that have multiple bonds between atoms. The torsion angle between functional groups on each side of a multiple bond are locked into one position, and this effect can be achieved by providing flange means 112 extending from the outer end of at least one side of the shank 109. The flange means illustrated in FIG. 8 extends from opposite sides of the shank and is approximately the same width as the slots 32 and 33 in the fastener 26. In effect, the slot and key arrangement of the slot 24 and key 42 in FIG. 1 is reversed, with the flange 112 serving as a key extending laterally from the shank 109 and the slot being the slot 32 or 33 or both in the tubular portion 27. The reason for having the flange 112 extending outwardly in the trigonal structure in FIG. 8 is that it facilitates molding the component 108 by allowing a simpler mold than if the slot 24 and internal key 42 of FIG. 1 were used. Furthermore, the flange 112 can be as wide as desired and is not restricted in size by being located within a tubular member, as the key 42 is in FIG. 1.

While this invention has been described in terms of a specific embodiment, it will be apparent to those skilled in the art that modifications may be made therein within the true scope of the invention as defined by the following claims.

What is claimed is:

1. An interlocking molecular model system comprising:
 a first component representative of an atom and including at least one elongated shank extending outwardly from a part of the component representing the nucleus of the atom, the shank having
 a first cylindrical section of one cross sectional area at its outer end,
 a second cylindrical section of smaller cross-sectional area adjacent the end of the first cylindrical section facing the part of the component representing the nucleus, the surface of the shank between the first and second cylindrical sections defining a shoulder extending inwardly from the surface of the first cylindrical section, and
 an abutment extending transversely outwardly relative to the axial direction of the second cylindrical section and adjacent the end of the second cylindrical section closer to the part of the component representing the nucleus; and a fastener component comprising a hollow tubular portion longitudinally slotted at one end and having an axial length representative of a predetermined portion of a covalent radius of the atom, the inner surface at one end of the slotted end portion comprising an inwardly extending axial lock fitting over the second cylindrical section of the first component to be hooked behind the shoulder on the shank and having an axial length substantially equal to the axial length of the second cylindrical section, whereby the fastener component can be axially interlocked with the shank so that the distance between the part of the first component representing the nucleus and the remote end of the tubular portion of the fastener component is representative of the covalent radius of that atom, and the inner surface of the part of the tubular portion between the axial lock and the remote end has a cross-sectional area large enough to fit over the first cylindrical section.

2. The invention as defined in claim 1 in which the shoulder slopes inwardly.

3. The invention as defined in claim 1 in which the outermost portion of the outer end of the first cylindrical section is beveled to facilitate insertion of the first cylindrical section through the slotted end portion of the fastener component.

4. The invention as defined in claim 1 in which the abutment extending outwardly from the elongated shank is a flange that extends generally radially along the shank in a region thereof between the part of the component representing the nucleus and the second cylindrical section.

5. The invention as defined in claim 1 comprising, in addition: a slot extending longitudinally along at least a portion of the first cylindrical section, the inner surface of the fastener component comprising an inwardly extending key shaped to slide in the slot to fix angular orientation of the fastener component relative to the elongated shank.

6. The invention as defined in claim 5 in which the longitudinal slot extends from the outer end of the first cylindrical section substantially to the abutment on the elongated shank.

7. The invention as defined in claim 6 in which the inwardly extending key on the inner surface of the fastener component is a part of the inner surface of the fastener component defining the axial lock.

8. The invention as defined in claim 1 in which the cross-sectional area of the first cylindrical section is polygonal, and the inner surface of the part of the tubular portion between the axial lock and the remote end is polygonal and of corresponding shape, whereby the fastener component can be rotated on the shank into a predetermined number of angular orientations corresponding to the number of sides of the polygon defined by the cross-section of the first cylindrical section.

9. The invention as defined in claim 1 in which the second cylindrical section of the elongated shank has a polygonal cross-sectional area, and the inner surface at the slotted end portion of the fastener component has a matching polygonal cross-sectional configuration, whereby the fastener component can be rotated on the shank only to a number of specific angular orientations corresponding to the number of sides of the polygon defined by the cross-section of the second cylindrical section of the shank.

10. The invention as defined in claim 1 comprising, in addition, a flexible tube having an internal diameter that fits over and grips the first cylindrical section of each of two of the first components to join said first component together, the length of the atomic bond between atoms represented by said first components being substantially proportional to the sum of the distances from the part of each of said first components representing the nuclei of the respective atoms to the respective abutments of said first components plus the length of the flexible tube.

11. The invention as defined in claim 10 in which each of said first components is molded of plastic in tetrahedral form with three of said shanks, each angularly separated from each of the other shanks by an angle of 109.5°, and the respective first components are angularly displaced from axial alignment with each other, whereby the tubing is bent in accordance with representation of a strained bond relationship in a strained molecule.

12. The invention as defined in claim 1 comprising in addition, a space-filling component representing a second atom comprising:
a spherically curved surface having a radius of curvature substantially to scale according to van der Waals's radius for the second atom;
a second surface spaced from the curved surface by a predetermined distance from the center of the curved surface; and
an aperture in the second surface to fit snugly over the first cylindrical section to hold the space-filling component on the shank.

13. The invention as defined in claim 12 in which the predetermined distance is such that the distance from the center of the spherically curved surface to the part of the first component representing the nucleus of the firstnamed atom when the second surface is against the abutment is substantially a scale representation of the sum of the van der Waals's radius of the second atom plus the internuclear distance between the first-named atom and the second atom in a molecule.

14. The invention as defined in claim 1 comprising, in addition, a substantially rigid tubular member hollow at least at one end and having there an inner diameter to fit snugly on the first cylindrical section, whereby the rigid tubular member and the first component thus assembled comprise a framework molecular model.

15. The invention as defined in claim 14 in which the length of the rigid tubular member is substantially longer than the scale length of the sum of the van der Waals's radius and the covalent radius for the second atom.

16. The invention as defined in claim 1 comprising, in addition, a space-filling component representing the atom and including a space-filling portion that has a spherically curved surface with a center of curvature at the part of the space-filling component representing the nucleus of the atom, the shank extending away from the space-filling portion in the direction opposite to the convex direction of the spherically curved surface.

17. An interlocking molecular model system comprising:
a first component representative of an atom and including at least one elongated shank extending outwardly from a part of the component representing the nucleus of the atom, the shank having
a cylindrical section of one cross sectional area at its outer end, flange means extending laterally outwardly therefrom near the outer and, means defining a shoulder extending inwardly from the surface of the first cylindrical section, and an abutment extending transversely outwardly relative to the direction of the shank between the shoulder and the part of the component representing the nucleus; and a fastener component comprising a hollow tubular portion longitudinally slotted at one end to receive the flange means and having an axial length representative of a predetermined portion of a covalent radius of the atom, the inner surface at one end of the slotted end portion comprising an inwardly extending axial lock adapted to be hooked behind the shoulder on the shank, whereby the fastener component can be axially interlocked with the shank so that the distance between the part of the first component representing the nucleus and the remote end of the tubular portion of the fastener component is repesentative of the covalent radius of that atom, and the inner surface of the part of the tubular portion between the axial lock and the remote end has a cross-sectional area large enough to fit over the first cylindrical section.

* * * * *

UNITED STATES PATENT AND TRADEMARK OFFICE
CERTIFICATE OF CORRECTION

PATENT NO. : 4,348,190

DATED : September 7, 1982

INVENTOR(S) : Edward J. Barrett

It is certified that error appears in the above-identified patent and that said Letters Patent are hereby corrected as shown below:

Column 2, line 10, delete "the" and insert --a--

Column 5, line 53, delete "32" and insert --42--

Signed and Sealed this

Fifth Day of April 1983

[SEAL]

Attest:

GERALD J. MOSSINGHOFF

Attesting Officer     Commissioner of Patents and Trademarks